G. P. KINGSBURY.
TYPOGRAPHICAL MACHINE.
APPLICATION FILED JAN. 12, 1917.
1,263,773.
Patented Apr. 23, 1918.
5 SHEETS—SHEET 1.
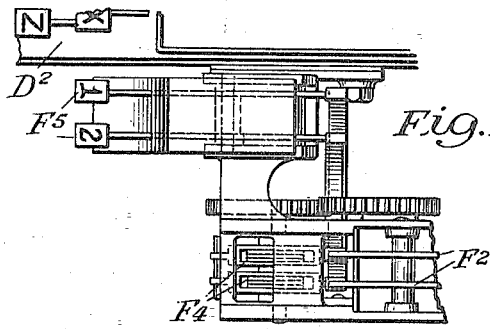
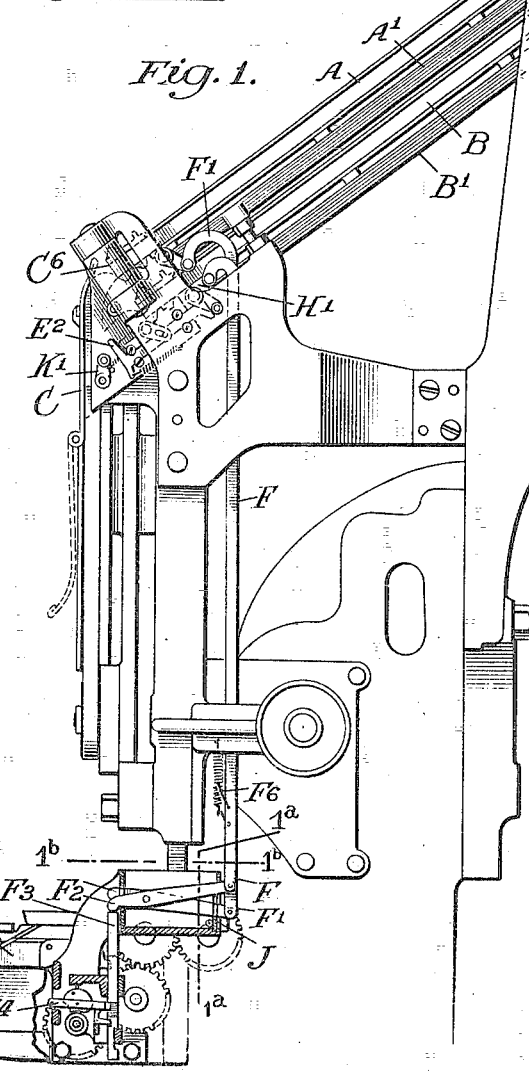
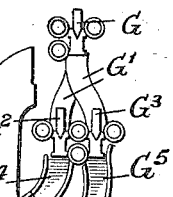
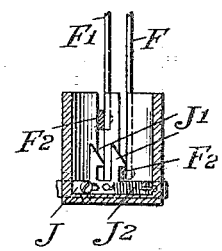

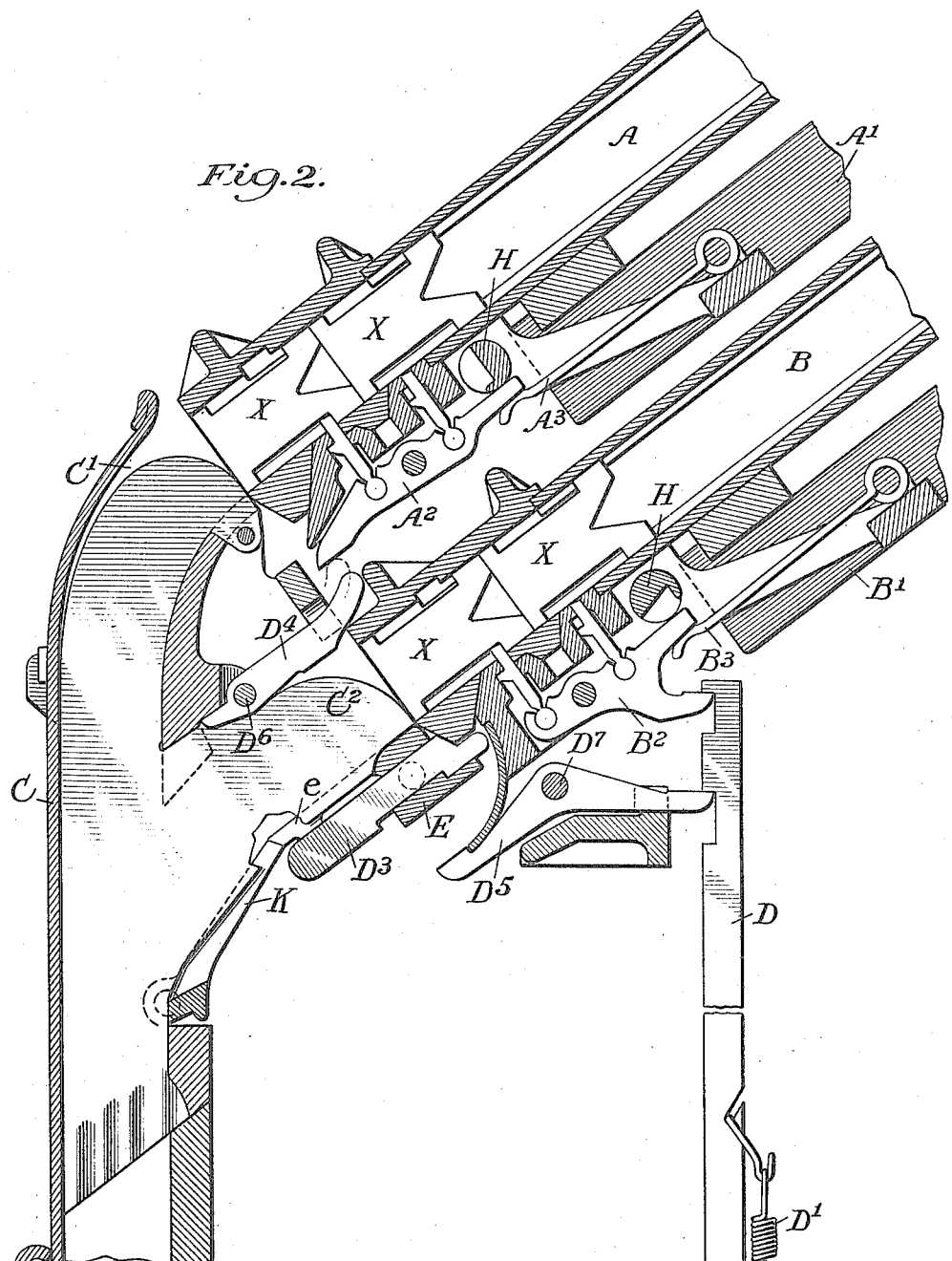

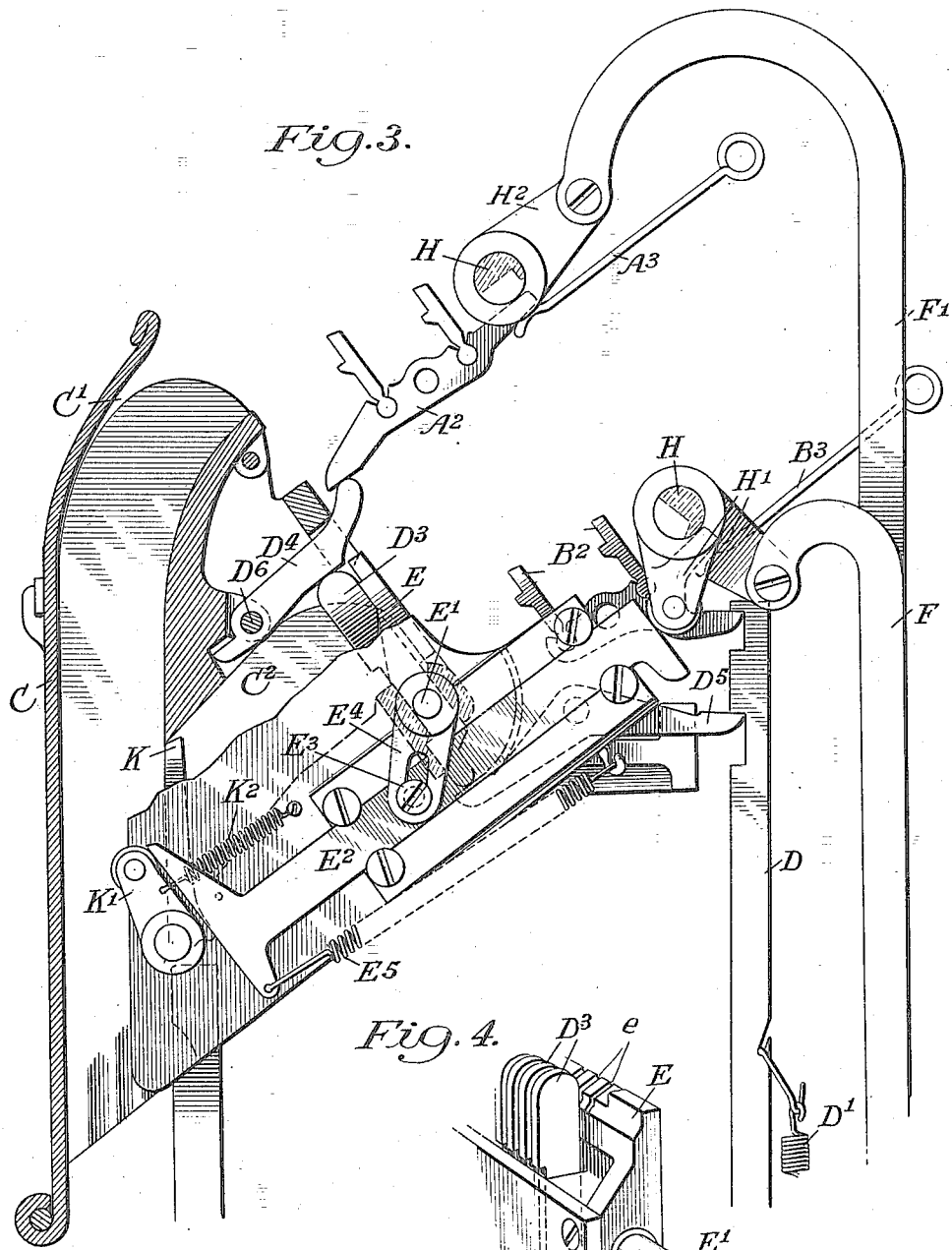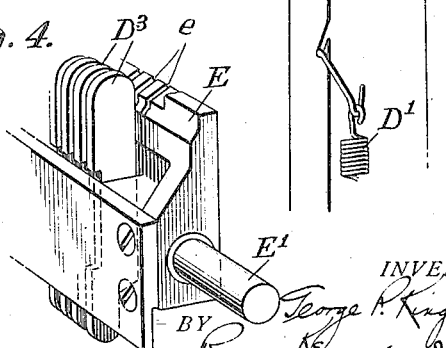

G. P. KINGSBURY.
TYPOGRAPHICAL MACHINE.
APPLICATION FILED JAN. 12, 1917.

1,263,773.

Patented Apr. 23, 1918.
5 SHEETS—SHEET 4.

WITNESSES:

INVENTOR
BY
ATTORNEYS

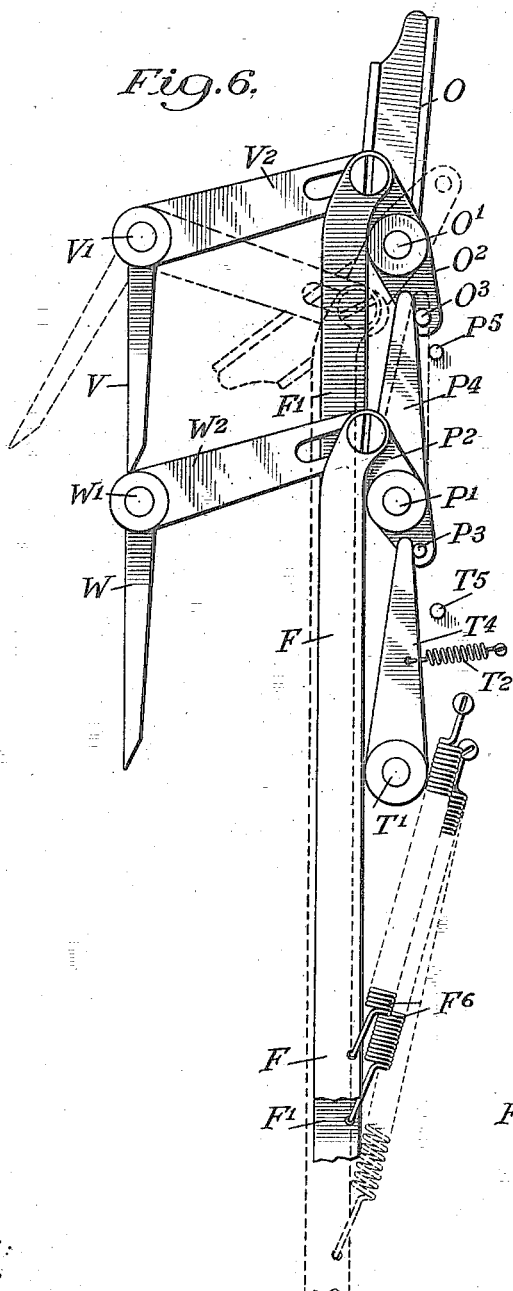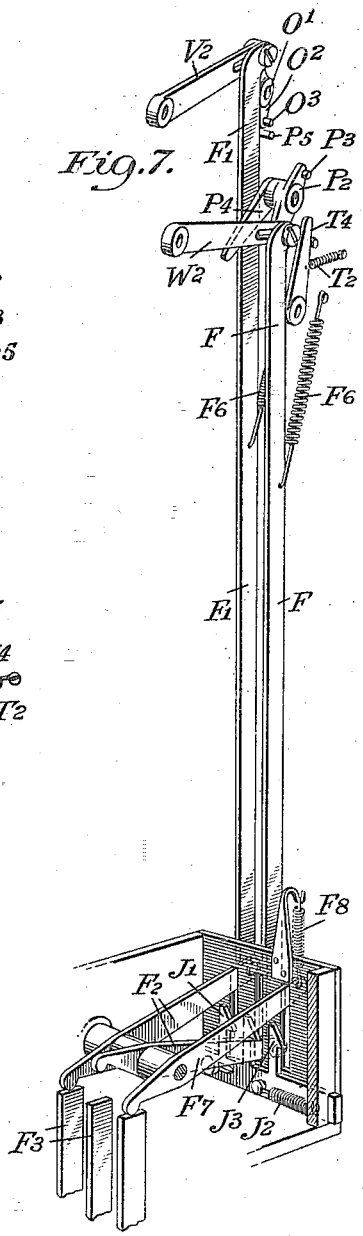

UNITED STATES PATENT OFFICE.

GEORGE P. KINGSBURY, OF BROOKLYN, NEW YORK, ASSIGNOR TO MERGENTHALER LINOTYPE COMPANY, A CORPORATION OF NEW YORK.

TYPOGRAPHICAL MACHINE.

1,263,773.        Specification of Letters Patent.      Patented Apr. 23, 1918.

Application filed January 12, 1917. Serial No. 141,933.

*To all whom it may concern:*

Be it known that I, GEORGE P. KINGSBURY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent No. 436,532, to O. Mergenthaler, wherein circulating matrices are released by escapements from a magazine in the order in which their characters are to appear in print and then assembled in line, the composed line transferred to the face of a mold, the mold filled with molten metal to form a slug or linotype against the matrices which produce the type characters thereon, and the matrices thereafter elevated and returned through distributing mechanism to the magazine from which they started. More particularly, it relates to machines equipped with a plurality of magazines containing matrices of different font or face, any selected one of which may be brought into action at will.

In one class of such machines, the magazines are arranged in constant relation to the assembler entrance having fixed receiving throats leading thereto, and the matrix releasing escapements actuated by reeds which extend through the throats or across the lower ends of the magazines, thus requiring the matrices to pass between the reeds in their travel from the magazines to the assembler entrance. This arrangement of the actuating reeds necessarily restricts the size or thickness of the matrices which can be used in the machine, as the spaces between the adjoining reeds are limited and cannot be increased without altering the entire keyboard mechanism or the magazine construction. There are other disadvantages which need not be pointed out.

My present invention is intended to avoid the above objections and aims to provide a construction wherein the matrices may be discharged from any one of the magazines into the assembler entrance without having to pass between the escapement actuating reeds, and thus to allow the use of matrices of any size or thickness which the magazines themselves are capable of handling. To this end, specifically, I provide the fixed entrance throat leading to an inner or lower magazine with a slotted bottom plate which can be swung out of or into registration with the magazine at will, and I locate upon said plate a set of actuating members which, when the plate is in active position, are free and clear of the matrices passing through the throat, and which, when the plate is in inactive position, are located across the throat in operative relation to the escapements of an outer or upper magazine, means also being provided whereby the keyboard mechanism is operatively connected to said actuating members or to the escapements of the lower magazine according to the position of the throat plate. In this way, any selected magazine may be brought into use at will and the matrices discharged therefrom without any interference with the escapement actuating mechanism. Other features and advantages will appear from the detailed description to follow.

In the accompanying drawings, I have shown my invention in preferred form and by way of example and as applied to a machine of the class stated, but obviously many changes and variations may be made therein and in its mode of application which will still be comprised within its spirit. Thus, it may be applied to other forms of typographical machines, such as typesetters, typecasters and the like, which handle type or dies instead of matrices. Generally speaking, I desire it to be understood that I do not limit myself to any specific form or embodiment, except in so far as such limitations are specified in the claims.

Referring to the drawings:

Figure 1 is a side elevation of a portion of a linotype machine having my invention applied thereto;

Fig. 1ª is a section on the line 1ª—1ª of Fig. 1;

Fig. 1ᵇ is a plan view on the line 1ᵇ—1ᵇ of Fig. 1;

Fig. 2 is a vertical section through the magazines and assembling mechanism;

Fig. 3 is a similar view showing the parts in different position and with the magazines removed;

Fig. 4 is a detached perspective of a portion of the movable throat plate and the actuating members thereon and Figs. 5, 6 and 7 illustrate a modification.

Figure 5:
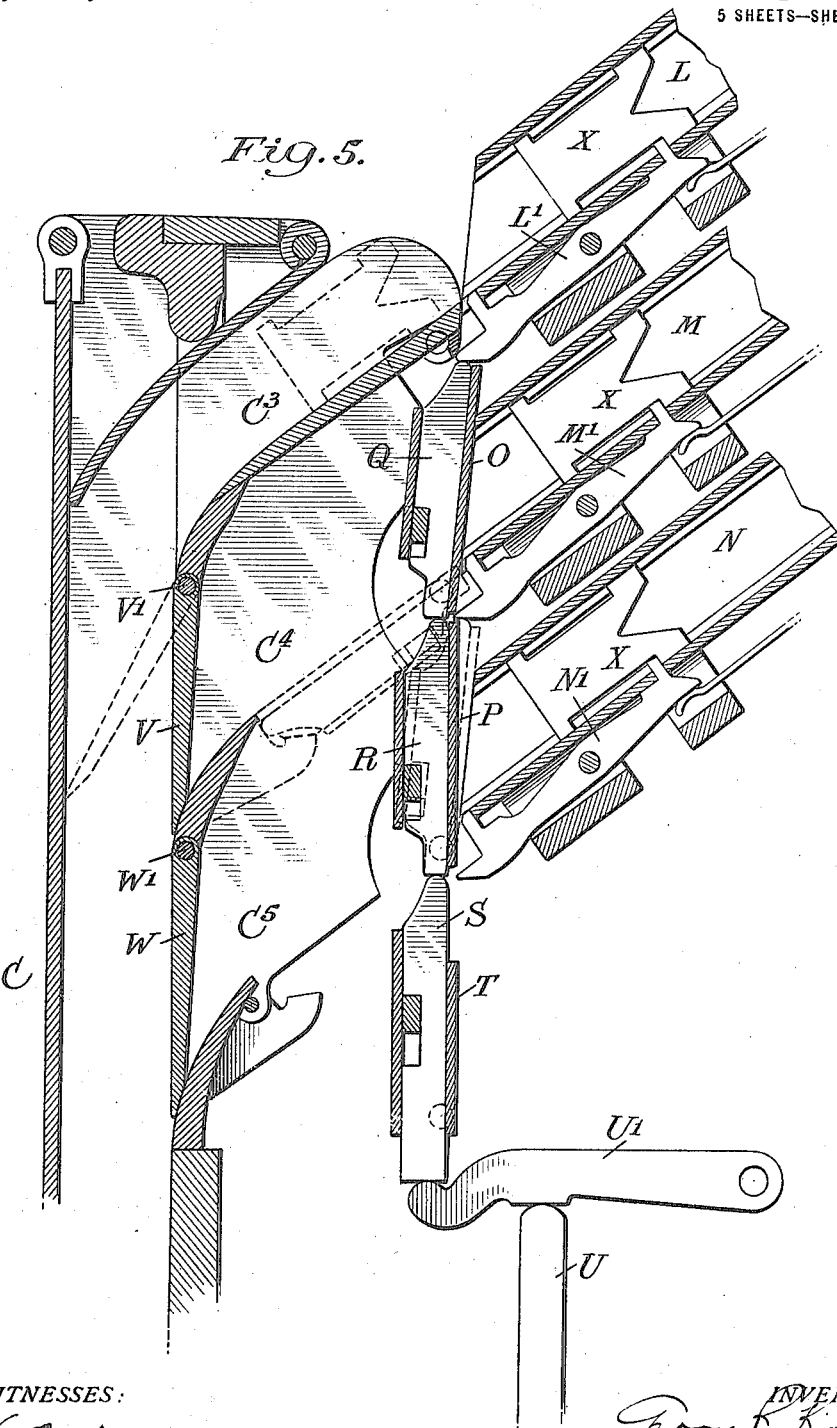

Referring to Figs. 1 to 4, the matrices X are stored according to font in the superposed channeled magazines A and B, which are supported upon the stationary base frames $A^1$ and $B^1$ in registration with the fixed receiving throats $C^1$ and $C^2$ of the raceway or assembler entrance C, divided by the customary partition plates into channels, through which the matrices pass to the composing stick or assembler as they are released from the magazines. After their composition in line, the matrices are presented to the casting mechanism for the production of the slug and thereafter carried upward and delivered to the font separator G which assorts them according to font and drops them into one or another of the tubes $G^1$ leading to the distributers $G^2$, $G^3$, which return them to their proper channels in the magazines A and B through the associated channel entrances $G^4$ and $G^5$. The release of the matrices from the magazines A and B is controlled by the escapements $A^2$ and $B^2$, arranged in banks or series, and acting through openings in the under sides of the magazines. The escapements of both magazines are adapted to be actuated by the common series of reeds or operating devices D, which are controlled from the keyboard $D^2$ in the usual way. The parts so far described, except as hereinafter pointed out, are or may be of any well-known or approved construction.

Coming now to my invention, it will be noted that the reeds D are constantly connected at their upper ends directly to the escapements $B^2$ of the lower magazine B (Fig. 2), the escapements being held normally with their front pawls in engagement with the leading matrices in the magazine by the downward pressure of the reeds caused by the strong connected springs $D^1$. When the reeds are raised upon the actuation of the keyboard, the escapements are allowed to be rocked by the weak springs $B^3$ so as to withdraw the forward pawls from the magazine to permit the escape of the leading matrices, and at the same time to project the rear pawls into the magazine to arrest the following matrices, after which the escapements are restored to their former position by the return or downward movement of the reeds. The escapements $A^2$ of the upper magazine are operated in a similar manner, being rocked in one direction by the springs $A^3$ and in the opposite direction by the reeds D when the latter are operatively connected therewith.

To provide for the connection of the reeds D and escapements $A^2$, the fixed throat $C^2$ leading to the lower magazine B is formed with a bottom plate or section E provided near its rear edge with laterally projecting studs $E^1$ journaled in suitable bearings in the framework of the assembler entrance to adapt it to be swung upwardly and downwardly through the throat out of and into registration with the lower magazine at will, the plate having slots $e$ at its free end (Fig. 2) so as to clear the partition plates of the throat during its swinging movements. Slidably mounted on the under side of the swinging plate E, in suitable slots or guideways, there is a set of actuating members $D^3$, which in the active position of the plate are supported in inoperative position free and clear of the matrices as they pass through the throat $C^2$, and which in the inactive position of the plate are located in operative position across the throat or the lower end of the magazine B. In their latter position, the members $D^3$ establish an operative connection between two series of independently mounted actuating levers $D^4$ and $D^5$, the former series being pivoted to the assembler entrance, as at $D^6$, and arranged to engage and actuate the escapements $A^2$ of the upper magazine A, and the latter series being centrally pivoted to the machine frame, as at $D^7$, and connected at their rear ends to the reeds D and having their forward ends arranged to engage and actuate the members $D^3$. In other words, in the inactive position of the plate E, the actuating members $D^3$ are brought into operative relation to the reeds D and the escapements $A^2$ of the upper magazine so as to establish a connection between these parts. With the parts so connected, it follows that when the reeds D are raised upon the actuation of the keyboard, the escapements $A^2$ are allowed to be rocked by their springs $A^3$ to release the leading matrices, and when the reeds are returned or forced downward by their springs $D^1$, the actuating members $D^3$ are shifted upwardly by the pivoted levers $D^5$ to restore the escapements through the medium of the levers $D^4$ to their original position.

Unless means were otherwise provided, when the actuating members $D^3$ occupy their operative position, the reeds D would operate the escapements of both magazines, and, similarly, when the actuating members occupy their inoperative position, the escapements $A^2$ of the upper magazine would, under the influence of their springs $A^3$, assume an abnormal position and release all of the leading matrices from that magazine. Each series of escapements, therefore, is equipped with the well-known rock shaft H, which is arranged in proximity to the rear ends of the escapement levers, being cut away or recessed in the usual way, so that in one position it will lock the escapements against operation, while in another position it will permit their operation. Since the operation of the rock shafts depends upon the position of the throat plate E, means are provided whereby the movement of the plate to inactive position effects the locking of the escapements of the lower magazine and the unlocking of the escapements of the upper magazine, so as to establish an operative connection between the latter and the keyboard, and whereby the movement of the plate to active position effects the reverse action of the parts, viz., the locking of the escapements of the upper magazine and the unlocking of the escapements of the lower magazine so as to establish an operative connection between the latter and the keyboard, it being noted that the locking and unlocking of the escapements of the lower magazine involves the breaking and making of the operative connection of such magazine with the keyboard even though the reeds D are not actually disengaged from the escapements. Preferably, and as herein illustrated, such means are power actuated and controlled by finger keys, so that any selected magazine may be brought into use quickly and without any effort on the part of the operator. In the present instance, the means employed are somewhat similar to those illustrated in the application of David S. Kennedy, Serial No. 52,999, to which reference may be had if desired.

As shown particularly in Fig. 3, the rock shaft H for the lower series of escapements $B^2$ is provided with a bell crank lever $H^1$, having its rear arm connected to the upper end of a vertical reciprocating rod F, and its forward arm equipped with a roller bearing against the rear end of a fore and aft slide $E^2$ held in constant engagement therewith by a spring $E^5$ pulling rearwardly thereon. The slide $E^2$ is connected by a pin and slot connection $E^3$ to a crank arm $E^4$ fast on one of the studs $E^1$ of the throat plate E, so that, through the connections described, the movement of the rock shaft H to active and inactive position by the rod F effects the corresponding movement of the plate E to inactive and active position, respectively. Similarly, the rock shaft H for the upper series of escapements $A^2$ is provided with a crank arm $H^2$ which is connected to the upper end of a second reciprocating rod $F^1$. As shown in Fig. 1, the two rods F and $F^1$ are disposed side by side and are connected at their lower ends to two centrally pivoted levers $F^2$ operated through the medium of short slides $F^3$ by power driven cam yokes $F^4$ controlled in the usual way by finger keys $F^5$ disposed alongside the main keyboard (see also Fig. 1$^b$). The rods F and $F^1$ are both constantly urged upward by springs $F^6$, but one is always held down against the action of its spring by one or the other of the hooks $J^1$ projecting upwardly from the locking plate J (Fig. 1$^a$). The plate J is normally held toward the right by a spring $J^2$ with the inclined ends of its hooks in the path of the levers $F^2$, so that as one or the other of the latter is rocked downward, it displaces the locking plate toward the left and passes beyond the corresponding hook, which then immediately snaps across the lever and holds it depressed. It will be noted, however, that the displacement of the locking plate by one of the levers releases the other which had previously been locked down, and consequently permits the connected rod to be shifted upward by the corresponding spring. In other words, the arrangement is such that when one of the rods F, $F^1$, is moved downwardly the other is moved upwardly, and vice versa.

The operation will now be clear. When the No. 2 finger key is actuated, the rod $F^1$ is depressed and locked down so as to move the upper rock shaft to and hold it in locking position, while the rod F, which had previously been locked down, is released and allowed to rise under the influence of its spring $F^6$ to move the lower rock shaft to inactive position and the plate E to active position, permitting the reeds D to actuate the escapements $B^2$, and thus bringing the lower magazine into use. Similarly, when the No. 1 key $F^5$ is actuated, the rod F is depressed and locked down to move the lower rock shaft to active position and the plate E to inactive position, while the rod $F^1$, which had previously been locked down, is released and allowed to rise under the influence of its spring $F^6$ to move the upper rock shaft to inactive position, permitting the escapements $A^2$ to be actuated by the reeds D and thus bringing the upper magazine into use. In this way, it is possible to change back and forth between the magazines by the mere depression of a finger key, realizing all the advantages of that feature without having the matrices pass through any part of the escapement actuating devices as they are released from the magazines in addition to other advantages unnecessary to point out.

In order that the matrices released from the upper magazine may pass by the lower throat $C^2$ in their travel through the entrance or raceway C, there is provided a cover plate K to close the opening or passageway between the throat and raceway. The plate K constitutes the front portion of the bottom side of the throat $C^2$ and is pivoted at its lower edge so as to be swung upwardly and downwardly to active and inactive position, respectively, acting in its inactive position to form a continuation of the plate E before described (see Fig. 2). The movement of the cover plate is effected automatically with the other parts, being provided for this purpose with a crank arm $K^1$ which carries a roller contacting with the forward end of the slide $E^2$ and held in constant engagement therewith by a spring $K^2$. As a result, when the upper magazine is brought into use, which involves the forward movement of the slide E², the cover plate is thrown upward to active position (Fig. 3); and when the lower magazine is selected, which involves a rearward movement of the slide E², the cover plate is thrown downwardly to inactive position by its spring K² (Fig. 2).

In order to give free access to the magazines for purposes of removal or otherwise, the upper portion of the raceway C, is pivoted to one side of the machine frame, as at C⁶, so as to be swung forwardly away from the magazines and to one side thereof carrying the various connected parts therewith, it being observed that the connection between the slide E² and the rock shaft H of the lower magazine, as well as that between the actuating members D³ and their operating levers D⁵, is made and broken as the raceway is moved to and from its operative position.

In Figs. 5, 6 and 7, the improvements are shown as applied to a machine equipped with three magazines, L, M and N, equipped with the spring-actuated escapements L¹, M¹ and N¹ of the "reverse" variety. The channeled raceway or entrance C is provided with fixed throats C³, C⁴ and C⁵ leading to the respective magazines, the two latter throats (like the throat C² of the first form) having slotted bottom plates O and P fixed at their rear edges to pivot studs O¹ and P¹, respectively, so as to be movable upwardly and downwardly through the throats to inactive and active position, respectively. The throat plates or elements O and P are provided on their under sides with sets of actuating members Q and R disposed longitudinally thereof and slidably arranged in slots or guideways formed therein, the two plates when in active position supporting the actuating members free and clear of the matrices as they pass through the corresponding throats. The actuating members Q and R are adapted to actuate the escapements L¹ and M¹ of the magazines L and M, respectively, being brought into direct engagement with the escapements by the movement of the throat plates upwardly to inactive position. To operate the escapements N¹ of the lowermost magazine N, there is provided a third set of actuating members S slidably supported in a grooved plate or frame T fixed at its lower edge to pivot studs T¹ and capable of a slight to and fro rocking movement so as to locate the actuating members beneath or beyond the forward ends of the escapements. All three sets of actuating members Q, R and S are operated from a common series of reeds or operating devices U, which are controlled in the usual way from the regular keyboard. The reeds U are constantly engaged with the actuating members S through the medium of the pivoted levers U¹, so that their connection to the lower magazine may be effected merely by rocking the plate T rearwardly to a slight extent to locate the actuating members S beneath the escapements N¹. In effecting the operation of the escapements of either of the other two magazines, however, the plate T is rocked forwardly to a truly vertical position to locate the actuating members S beyond or out of engaging relation to the escapements N¹, and as thus located, they are adapted to engage and actuate the overlying set of actuating members R when the latter are moved to their upright position by the throat plate P. It is pointed out that the plate P is capable of occupying two different upright positions, one rearward slightly beyond the vertical to locate the actuating members R beneath and in engaging relation to the escapements M¹ and the other forward and truly vertical to locate them beyond or out of engaging relation to said escapements. In the latter position, the actuating members R are adapted to engage and actuate the overlying set of actuating members Q when the latter are located in their upright position by the throat plate Q, which may occupy but one upright position and that with its actuating members Q beneath or in engaging relation to the escapements L¹ of the uppermost magazine L. In other words, the arrangement is such that the connection of the key controlled reeds U to one or another of the magazines is controlled by the movement of the plates O, P and T, carrying the respective sets of actuating members Q, R and S, all three sets establishing the connection with the uppermost magazine, the two sets R and S establishing the connection with the middle magazine M, and the set S alone establishing the connection with the lowermost magazine N.

As in the first instance described, the movements of the plates O, P and T are effected by power actuated means under the control of finger keys, one for each magazine. Referring particularly to Figs. 6 and 7, it will be noted that the pivot studs O¹ and P¹ at one side of the machine are provided with bell cranks O² and P², whose forward arms are connected to the reciprocating rods F¹ and F previously mentioned and whose rear arms are formed with laterally projecting pins O³ and P³, adapted to engage and coöperate with arms P⁴ and T⁴ radiating from the pivot studs P¹ and T¹ of the plates P and T, respectively. The arrangement is such that when the plate P is thrown upwardly by the rod F to bring the actuating members R in engaging relation to the escapements M¹, the pin P³ engages the arm T⁴ and rocks the plate T forwardly to a slight extent to locate the actuating members S beyond the escapements N¹ and in engaging relation to the members R, and, similarly, when the plate O is thrown upwardly by the rod $F^1$ to bring the actuating members Q beneath the escapements $L^1$, the pin $O^3$ engages the arm $P^4$ and rocks the plate P forwardly to locate the actuating members S beyond the escapements $M^1$ and in engaging relation to the actuating members Q. Conversely, when the plate O is thrown downwardly from its upright position, the pin $O^3$ is disengaged from the arm $P^4$, and the plate P allowed to be rocked rearwardly by the rod F (which is urged upward by the spring $F^6$) to locate the actuating members R in engaging relation to the escapements $M^1$ (see dotted line in Fig. 6); and, likewise, when the plate P is thrown downwardly from its upright position, the pin $P^3$ is disengaged from the arm $T^4$ and the latter permitted, under the action of a spring $T^2$, to be drawn rearwardly to cause the plate T to locate the actuating members S in engagement with the escapements $N^1$ (see Fig. 7). If desired, stop pins $P^5$ and $T^5$ may be employed to limit the rearward movement of the arms $P^4$ and $T^4$.

The operation of the rods F and $F^1$ is effected in the same manner as described in connection with the first form; that is to say, they are depressed by the cam yokes $F^4$ under the control of the finger keys $F^5$ and raised by the springs $F^6$, the locking plate J, by means of its hooks $J^1$, coöperating with the pivoted levers $F^2$ to insure the raising of one of the rods as the other is depressed, and vice versa. In the present instance, however, the plate J is provided with a third hook $J^3$ to coöperate with a further pivoted lever $F^7$. The lever $F^7$ is a replica of the other levers $F^2$, and is adapted to be operated in the same manner by an independent cam yoke under the control of a third finger key, a spring $F^8$ attached to the rear end of the lever tending constantly to pull it upwardly.

The operation of the parts is as follows: Assuming the parts to be in the full-line position shown in Figs. 5 and 6, i. e., with the reeds U connected to the escapements of the uppermost magazine L, if it be desired to bring the middle magazine M into use, the corresponding selecting key is actuated, and the associated rod $F^1$ depressed and locked down so as to move the throat plate O to and hold it in active position, as indicated by dotted lines in these figures. The downward movement of the plate O disengages the pin $O^3$ from the arm $P^4$ connected to the underlying plate P and thus allows the latter to be thrown rearwardly to the dotted-line position shown to locate the actuating members R in engaging relation to the escapements $M^1$. If now it be desired to bring the lowermost magazine N into action, the corresponding selecting key is actuated, and the associated rod F depressed and locked down so as to swing the throat plate P downwardly to and hold it in active position, which action at the same time disengages the pin $P^3$ from the arm $T^4$ of the plate T and allows the latter to be drawn rearwardly by its spring $T^2$ to locate the actuating members S in engaging relation to the escapements $N^1$, as required. (See Fig. 7). The depression of the rod F, of course, effects the release of the rod $F^1$, which had previously been locked down, and the latter consequently rises under the influence of its spring $F^6$ to restore the plate O to its upright position. However, the actuating members Q carried by the plate O are located above the magazine N, and therefore do not interfere with the matrices as they pass therefrom. With the parts in the condition last described, that is, with the rod $F^1$ up and with the rod F down, the uppermost magazine L may be brought into use by the actuation of the additional selecting key mentioned, when the lever $F^7$ is rocked downwardly and locked, releasing the rod F that had previously been locked down and allowing it to rise under the influence of its spring to move the connected plate P upwardly as required, as a result of which all three sets of actuating members are brought into vertical alinement to establish an operative connection between the reeds U and the escapements $L^1$ of the magazine L. It will have been noted that in the upward movement of the plate P, its arm $P^4$ engages with the pin $O^3$ of the overlying plate O and consequently the actuating members R carried by the plate P are prevented from passing beyond the vertical position; and also that, due to the engagement of the pin $P^3$ with the arm $T^4$ connected to the plate T, the latter is rocked forwardly to locate the actuating members S in their vertical position beyond the escapements $N^1$ of the magazine N. In short, it is possible to select any one of the magazines at any time by the mere depression of a finger key, and this without requiring the matrices to pass through any part of the escapement actuating devices.

To provide a clear passage through the entrance C for the matrices as they are released from the upper magazines L and M, the throats $C^4$ and $C^5$ are provided with cover plates V and W to close the openings between the throats and the raceway, the plates being pivoted at their upper edges, as at $V^1$ and $W^1$, so as to be movable forwardly and backwardly to open and closed position, respectively. The two cover plates are connected to and are adapted to be operated synchronously with the throat plates O and P, the plate V being connected to the bell crank $O^2$ of the former by a link $V^2$, and the plate W being connected to the bell crank $P^2$ of the latter by a link $W^2$.

I have thus shown and described two different embodiments of my invention, but these have been selected merely by way of example and as preferred forms, and it will be obvious that many modifications and alterations therein and in its mode of application will suggest themselves to those skilled in the art without departure from its scope.

Having thus described my invention, its construction and mode of operation, what I claim and desire to secure by Letters Patent of the United States is as follows:

1. In a typographical machine, the combination of inner and outer matrix magazines each having a series of escapements, and escapement actuating mechanism including a set of actuating members for the escapements of the outer magazine, the said actuating members being located in an inoperative position out of the path of the matrices of the inner magazine when the latter is in use and mounted so as to be movable across said path into operative position at will to bring the outer magazine into use.

2. In a typographical machine, the combination of inner and outer matrix magazines each having a series of escapements, a series of key controlled operating devices operatively connected to the escapements of the inner magazine, a set of actuating members located out of the path of the matrices of the inner magazine and movable at will across said path into operative relation to the operating devices and the escapements of the outer magazine, and means for interrupting the operative connection between the operating devices and the escapements of the inner magazine when the actuating members are so moved.

3. In a typographical machine, the combination of inner and outer matrix magazines each having a series of escapements, a set of key controlled operating devices connected to the escapements of the inner magazine, a set of actuating members movable across the delivery end of the inner magazine into and out of operative relation to said operating devices and the escapements of the outer magazine, and means for making and breaking the operative connection of the operating devices with the escapements of the inner magazine as the actuating members are moved from and to their operative position, respectively.

4. In a typographical machine, the combination of inner and outer matrix magazines each having a series of escapements, a series of key controlled operating devices constantly engaged with the escapements of the inner magazine, a set of actuating members movable into and out of operative relation to said operating devices and the escapements of the outer magazine, and means for locking and unlocking the matrices in the inner magazine when the actuating members are moved to and from their operative position, respectively.

5. In a typographical machine, the combination of inner and outer matrix magazines each having a series of escapements, a series of key controlled operating devices constantly engaged with the escapements of the inner magazine, a set of actuating members movable into and out of operative relation to said operating devices and the escapements of the outer magazine, and means for locking the matrices in the inner and unlocking the matrices in the outer magazine, and vice versa, as the actuating members are moved to and from operative position, respectively.

6. In a typographical machine, the combination of inner and outer matrix magazines each having a series of escapements, a series of key controlled operating devices constantly engaged with the escapements of the inner magazine, a set of actuating members movable into and out of operative relation to said operating devices and the escapements of the outer magazine, locking devices for the escapements of the two magazines, and connections between said locking devices whereby one is moved to active and the other to inactive position, and vice versa, as the actuating members are moved to and from operative position, respectively.

7. In a typographical machine, the combination of inner and outer matrix magazines each having a series of escapements, a raceway to receive the matrices from the magazines, an intermediate connecting element to conduct the matrices from the inner magazine to the raceway, and a set of actuating members carried by the connecting element and disposed free and clear of the matrix path, said element being movable at will from its active position to locate the actuating members in operative relation to the escapements of the outer magazine.

8. In a typographical machine, the combination of inner and outer matrix magazines each having a series of escapements, a channeled raceway to receive the matrices from the magazines, an intermediate connecting element to conduct the matrices from the inner magazine to the raceway and movable from and to active position at will, and a set of actuating members arranged to be moved across the delivery end of the inner magazine into and out of operative relation to the escapements of the outer magazine as the connecting element is moved from and to its active position, respectively.

9. In a typographical machine, the combination of inner and outer matrix magazines each having a series of escapements, a channeled raceway to receive the matrices from the magazines, a fixed channeled throat through which the matrices from the inner magazine pass to the raceway, and a set of actuating members carried by a side plate of the throat and disposed free and clear of the matrices passing therethrough, the said side plate being movable at will from its active position to locate the actuating members in operative relation to the escapements of the outer magazine.

10. In a typographical machine, the combination of inner and outer matrix magazines each having a series of escapements, a channeled raceway to receive the matrices from the magazines, a fixed channeled throat arranged between the raceway and the inner magazine and having a side plate movable from and to active position at will, and a set of actuating members arranged to be moved into and out of operative relation to the escapements of the outer magazine as the throat plate is moved from and to its active position, respectively.

11. In a typographical machine, the combination of inner and outer matrix magazines each having a series of escapements, a channeled raceway to receive the matrices from the magazines, a fixed channeled throat arranged between the raceway and the inner magazine and having a side plate movable from and to active position, a set of actuating members supported by the movable plate and adapted to be carried thereby into and out of operative relation to the escapements of the outer magazine, and a series of key controlled operating devices adapted when the throat plate is in inactive position to operate the actuating members and when said plate is in active position to operate the escapements of the inner magazine.

12. In a typographical machine, the combination of inner and outer matrix magazines each having a series of escapements, a channeled raceway to receive the matrices from the magazines, a fixed channeled throat arranged between the raceway and the inner magazine and having a side plate movable from and to active position, a set of actuating members supported by the movable plate and adapted to be carried thereby into and out of operative relation to the escapements of the outer magazine, a series of key controlled operating devices, and means for effecting the operative connection of the operating devices with said actuating members or with the escapements of the inner magazine, according to the position of the movable throat plate.

13. In a typographical machine, the combination of inner and outer matrix magazines each having a series of escapements, a channeled raceway to receive the matrices from the magazines, a fixed channeled throat arranged between the raceway and the inner magazine and having a side plate movable from and to active position, a set of actuating members supported by the movable plate and adapted to be carried thereby into and out of operative relation to the escapements of the outer magazine, a series of key controlled operating devices, and means for moving the throat plate and for effecting the operative connection of the operating devices with the actuating members carried thereby or with the escapements of the inner magazine, according to the direction of movement of the throat plate.

14. In a typographical machine, the combination of inner and outer matrix magazines each having a series of escapements, a channeled raceway to receive the matrices from the magazines, a fixed channeled throat arranged between the raceway and the inner magazine and having a side plate movable from and to active position, a set of actuating members supported by the movable plate and adapted to be carried thereby into and out of operative relation to the escapements of the outer magazine, a series of key controlled operating devices, power actuated means for moving the throat plate and for effecting the operative connection of the operating devices with the actuating members carried thereby or with the escapements of the inner magazine according to the direction of movement of the throat plate, and finger key mechanism controlling the operation of said power actuated means.

15. In a typographical machine, the combination of inner and outer matrix magazines each having a series of escapements, a set of actuating members movable across the delivery end of the inner magazine into and out of operative relation to the escapements of the outer magazine, a series of operating devices, power actuated means for effecting the movement of the actuating members and for operatively connecting the operating devices to said members or to the escapements of the inner magazine as required, and finger key mechanism controlling the operation of said power actuated means.

16. In a typographical machine, the combination of inner and outer matrix magazines each having a series of escapements, a set of actuating members movable into and out of operative relation to the escapements of the outer magazine, a series of key controlled operating devices, selecting keys, one for each magazine, and intermediate power actuated means adapted upon the actuation of one key to move the actuating members into operative relation to the escapements of the outer magazine and to establish the operative connection of the operating devices therewith, and upon the actuation of the other selecting key, to move the actuating members out of operative relation to the escapements of the outer magazine and to establish the operative connection of the operating devices with the escapements of the inner magazine.

17. In a typographical machine, the combination of inner and outer matrix magazines each having a series of escapements and a movable locking device therefor, a set of actuating members movable into and out of operative relation to the escapements of the outer magazine, a series of key controlled operating devices constantly engaged with the escapements of the inner magazine, power actuated means for effecting the movement of the actuating members and for moving one locking device to active and the other to inactive position as required, and finger key mechanism for controlling the operation of said power actuated means.

18. In a typographical machine, the combination of inner and outer matrix magazines each having a series of escapements, a series of key controlled operating devices constantly engaged with the escapements of the inner magazine, a set of actuating members movable into and out of operative relation to said operating devices and the escapements of the outer magazine, a matrix locking device for the inner magazine movable to active and inactive position, power actuated means for effecting the movement of the actuating members and for moving the locking device to active or inactive position as required, and finger key mechanism controlling the operation of said power operated means.

19. In a typographical machine, the combination of inner and outer matrix magazines each having a series of escapements, a raceway to receive the matrices from the magazines, an intermediate connecting element carrying a set of actuating members and movable at will from its active position to locate said members in operative relation to the escapements of the outer magazine, a movable cover plate to close the passageway between the connecting element and the raceway, and means for effecting the simultaneous movement of said parts.

20. In a typographical machine, the combination of inner and outer matrix magazines each provided with a series of escapements, and a raceway having a throat leading to the inner magazine and divided by partition plates into channels for the matrices, the said throat being provided with a movable side plate formed with cuts or slots so as to clear the partition plates and carrying a set of actuating members adapted to be brought thereby into operative relation to the escapements of the outer magazine.

21. In a typographical machine, the combination of inner and matrix magazines each having a series of escapements, a raceway to receive the matrices from the magazines and arranged to be moved outwardly away from the magazines, and an intermediate connecting element carrying a set of actuating members and movable from and to active position to locate said members into or out of operative relation to the escapements of the outer magazine, the said connecting element being mounted upon the raceway so as to be movable therewith away from the magazines.

22. In a typographical machine, the combination of inner and outer matrix magazines each having a series of escapements, a raceway to receive the matrices from the magazines and arranged to be moved outwardly away from the magazines, an intermediate connecting element mounted upon the raceway and carrying a set of actuating members, and movable from and to active position to locate said members into or out of operative relation to the escapements of the outer magazine, and means for effecting the movement of the connecting element, the said means including devices mounted partly in the machine frame and partly on the raceway which are connected and disconnected as the raceway is moved to and from its operative position.

23. In a typographical machine, the combination of inner and outer matrix magazines each having a series of escapements, a raceway to receive the matrices from the magazines and arranged to be moved outwardly away from the magazines, a set of actuating members for the escapements of the outer magazine mounted upon the raceway and movable across the delivery end of the inner magazine to and from operative position at will, and a series of key controlled operating devices for said actuating members mounted in the machine frame.

24. In a typographical machine, the combination of inner and outer matrix magazines each having a series of escapements, a raceway to receive the matrices from the magazines, an intermediate connecting element to conduct the matrices from the inner magazine to the raceway and movable to and from active position, a set of actuating members supported by the connecting element and adapted to be carried thereby into and out of operative relation to the escapements of the outer magazine, a series of key controlled operating devices, and means for effecting the operative connection of the operating devices with said actuating members or with the escapements of the inner magazine according to the position of the movable connecting element.

25. In a typographical machine, the combination of inner and outer matrix magazines each having a series of escapements, a raceway to receive the matrices from the magazines, an intermediate connecting element to conduct the matrices from the inner magazine to the raceway and movable to and from active position, a set of actuating members supported by the connecting element and adapted to be carried thereby into and out of operative relation to the escapements of the outer magazine, a series of key controlled operating devices, and means for moving the connecting element and for effecting the operative connection of the operating devices with the actuating members carried thereby or with the escapements of the inner magazine according to the direction of movement of the connecting element.

26. In a typographical machine, the combination of inner and outer matrix magazines each having a series of escapements, a raceway to receive the matrices from the magazines, an intermediate connecting element to conduct the matrices from the inner magazine to the raceway and movable to and from active position, a set of actuating members supported by the connecting element and adapted to be carried thereby into and out of operative relation to the escapements of the outer magazine, a series of key controlled operating devices, power actuated means for moving the connecting element and for effecting the operative connection of the operating devices with the actuating members carried thereby or with the escapements of the inner magazine according to the direction of movement of the connecting element, and finger key mechanism controlling the operation of said power actuated means.

In testimony whereof, I have affixed my signature.

GEORGE P. KINGSBURY.

Witnesses:
CHARLES E. GRANT,
CHAS. L. BECK.

Copies of this patent may be obtained for five cents each, by addressing the "Commissioner of Patents, Washington, D. C."